J. A. STONE.
CORN HARVESTER.
APPLICATION FILED SEPT. 10, 1909.
949,736.
Patented Feb. 15, 1910.
3 SHEETS—SHEET 3.
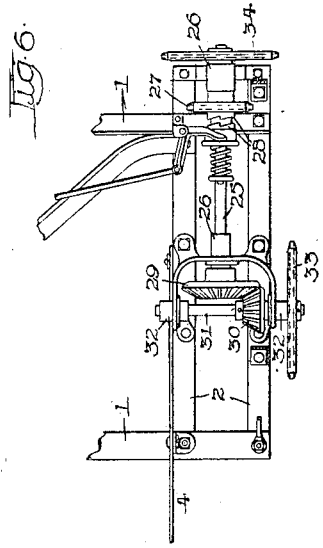
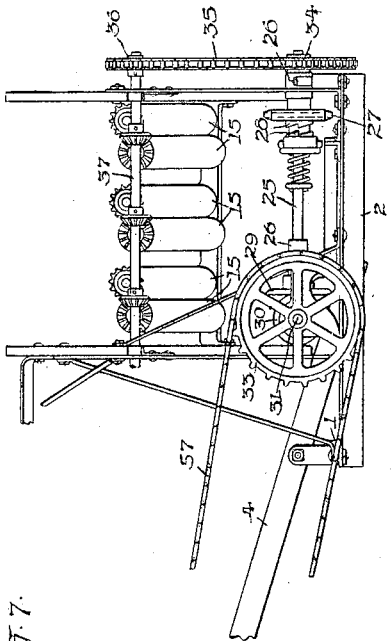
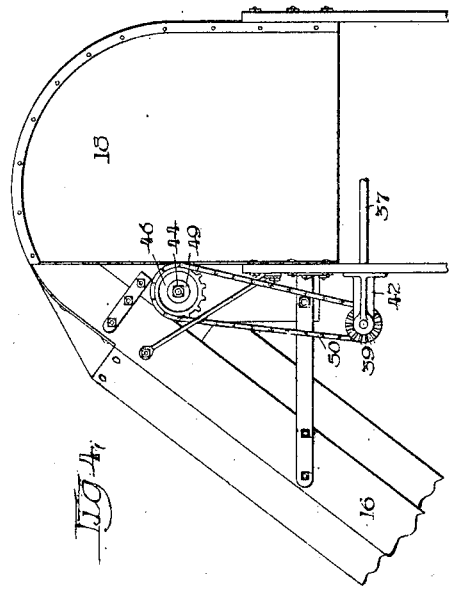
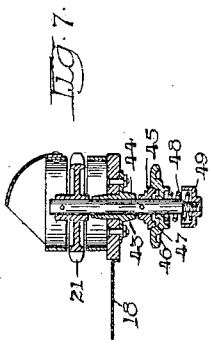
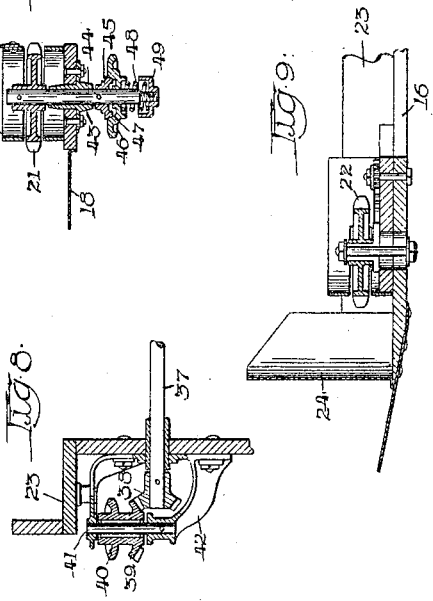
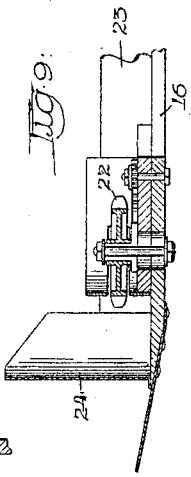
Witnesses:
F. W. Hoffmeister
Thos. Kiely
Inventor
John A. Stone
By E. W. Burgess
Attorney

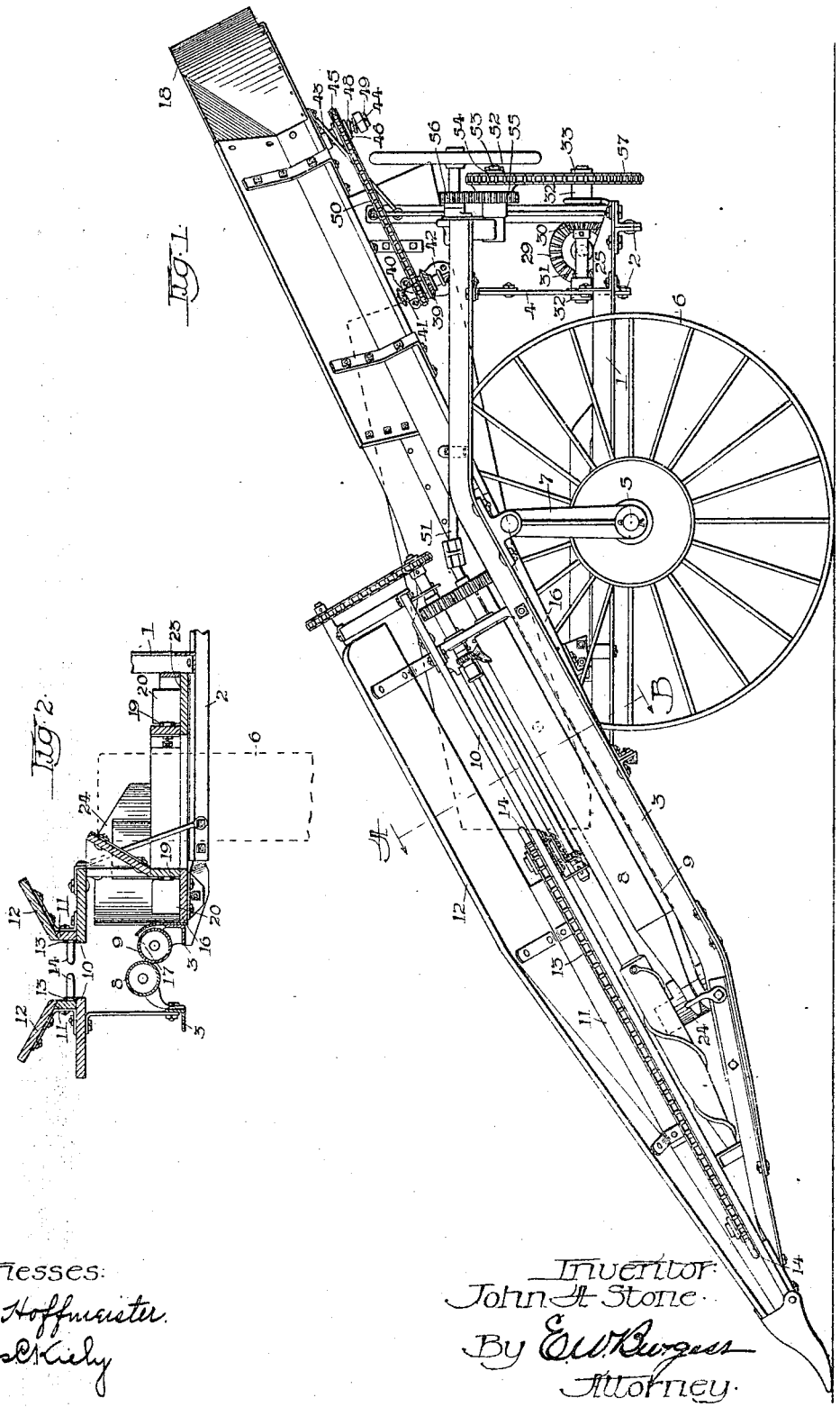

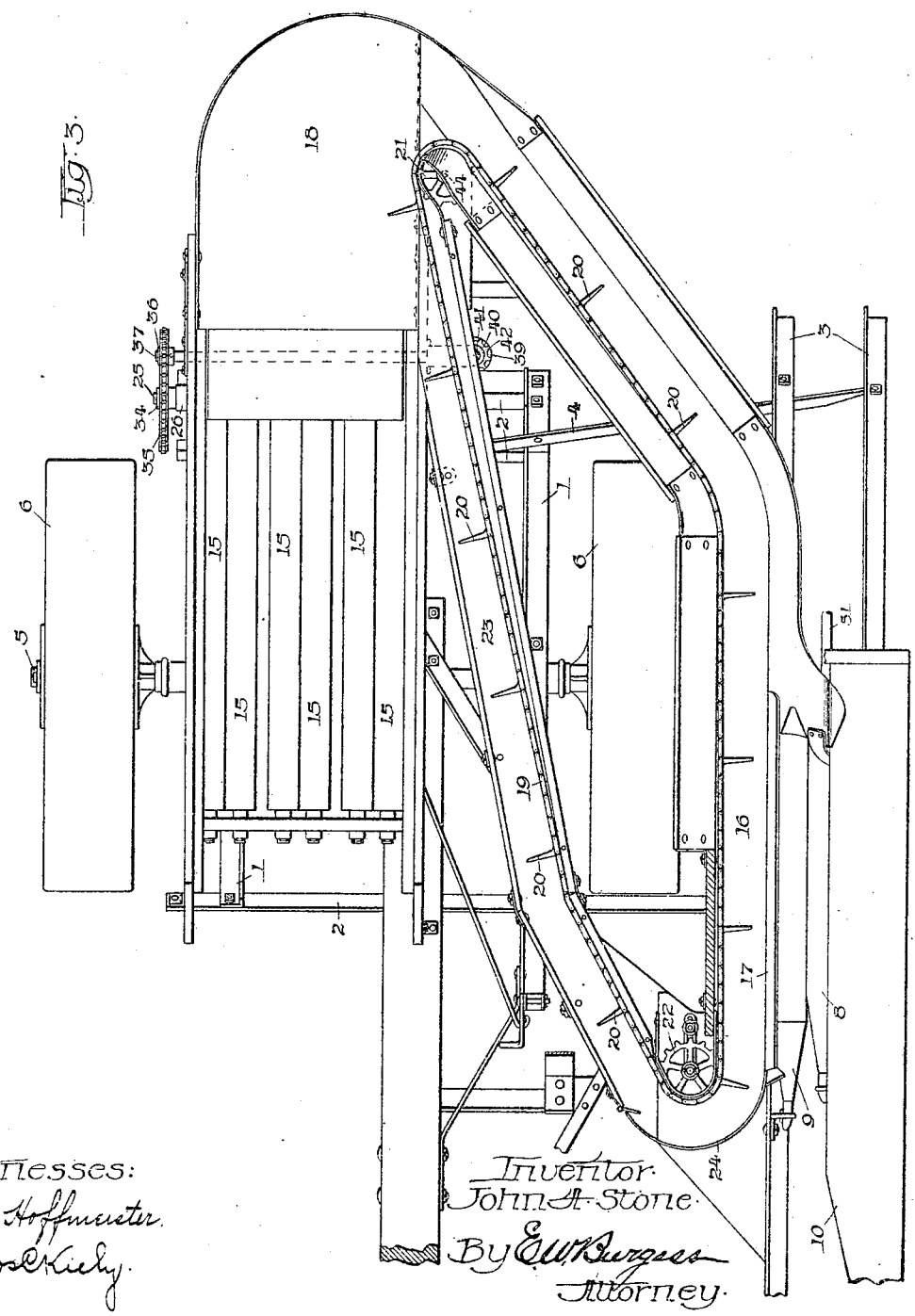

UNITED STATES PATENT OFFICE.

JOHN A. STONE, OF CHICAGO, ILLINOIS.

CORN-HARVESTER.

949,736.

Specification of Letters Patent.   Patented Feb. 15, 1910.

Application filed September 10, 1909.   Serial No. 517,010.

*To all whom it may concern:*

Be it known that I, JOHN A. STONE, a citizen of the United States, residing at Chicago, in the county of Cook and State of Illinois, have invented certain new and useful Improvements in Corn-Harvesters, of which the following is a specification.

My invention relates to corn harvesters designed to sever the ears from the standing stalks, remove the husks therefrom and conduct the ears to a receiving receptacle, and includes means for conducting the ears from the ear severing mechanism to the husking devices, and improved means for transmitting motion from the traction wheels to the husking mechanism and other operative parts of the machine; the object of my invention being to simplify the construction of a machine of this character, whereby the weight is greatly reduced and the power required to operate it materially lessened. I attain these objects by means of the mechanism illustrated in the accompanying drawings, in which—

Figure 1 is a side elevation of a corn harvester embodying my invention; Fig. 2 is a cross section of Fig. 1 along the line A—B; Fig. 3 is a top plan view of Fig. 1; Fig. 4 is a detached part of the rear end of the ear conveyer as shown in Fig. 1 looking upward; Fig. 5 is a rear end elevation of part of the machine designed to show the manner of transmitting motion to the husking mechanism and other operative parts of the machine; Fig. 6 is a top plan view of Fig. 5; Fig. 7 is a sectional detail of part of the motion transmitting means connected with the ear conveyer; Fig. 8 is a sectional detail of part of the power transmitting means connecting the ear conveyer with the driving shaft of the husking mechanism; and Fig. 9 is a sectional detail of the adjustable sprocket forming part of the motion transmitting means connected with the lower end of the ear conveyer.

The same reference characters designate like parts throughout the several views.

The wheel frame includes longitudinally arranged bars 1 and transverse bars 2, having their opposite ends secured to bars 1.

3 represents bars at the grainward side of the machine, having their rear ends arranged horizontally and secured to a frame bar 4 extending downward and stubbleward and secured to the longitudinal wheel frame members.

5 represents an axle mounted upon the wheel frame and having carrying wheels 6 journaled thereon, one of the carrying wheels being upon the stubbleward side of the wheel frame and the other near the grainward side thereof.

The bars 3 are supported intermediate their ends by means of a bracket 7, having its lower end connected with the axle 5 outside of the carrying wheel upon the grainward side of the machine, the body portion of the bars being inclined downward and forward from their connection with the bracket and having a portion at their forward ends turned upward relative to the body portion. The bars are spaced apart in a manner permitting them to receive between them a corn row, and 8 represents an ear snapping roller supported upon the bar at the grainward side of the passageway for the corn, inclined upward from front to rear, and 9 is a parallel coacting roller supported upon the bar at the opposite side of the passageway and arranged in a plane below that of the roller 8.

10 represents guide members above the rollers, arranged in a transverse plane and parallel in a longitudinal direction with the rollers and having a passageway between them.

11 represents vertically arranged members secured to the inner edges of the members 10, upon opposite sides of the passageway, and 12 represents angularly arranged ear deflecting members having their inner edges secured to the upper edges of the members 11 and diverging outward and upward.

13 represents stalk advancing chains mounted upon guides and having carrying fingers 14 operative to present the stalks to the snapping rollers.

15 represents a series of pairs of husking rollers mounted in a frame supported upon the wheel frame inside of the stubbleward carrying wheel, the rollers being arranged longitudinally relative to the direction of travel of the machine and inclined downward from rear to front, the rear ends of the rollers being their receiving ends. An ear receiving trough 16 is arranged adjacent the lower snapping roller, parallel therewith, and in a lower plane, having its outer wall 17 curved upward and toward the roller in a manner to be operative as a deck to guide the ears as they are severed from the stalks into the trough. The trough extends upward and rearward in the same plane as the snapping rollers until it passes the rear ends of said rollers, and is then inclined stubbleward and rearward in the same plane and connected at its rear end with a curved chute 18, inclined downward from rear to front and adapted to direct the ears to the receiving ends of the husking rollers. A conveyer chain 19, having flights 20 connected therewith at spaced intervals, is mounted in the trough, and motion is transmitted thereto by means of a sprocket wheel 21 located at the junction of the trough with the curved chute, and 22 represents a sprocket wheel that receives the chain at the lower end of the trough, that may be adjusted as shown in Fig. 9 in a manner to regulate the tension of the chain; the return lead of the chain being supported by means of a supplemental trough 23, having its rear end connected with the curved chute and its forward end with the ear conveyer trough by means of the curved portion 24, the two leads of the chain operating upon opposite sides of the grainward carrying wheel.

A transverse shaft 25 is mounted in bearings 26, secured to the rear end of the wheel frame, having journaled thereon a sprocket wheel 27 that may be operatively connected with the driving axle 5, and 28 represents a common form of clutch mechanism adapted to connect the sprocket wheel with the shaft 25. Secured to the grainward end of the shaft is a bevel wheel 29 that meshes with a pinion 30 secured to a short longitudinally arranged shaft 31 mounted in bearings 32 and having secured to its rear end a sprocket wheel 33. Secured to the stubbleward end of the transverse shaft 25 is a sprocket wheel 34 that is connected by chain 35 with a sprocket wheel 36 secured to the stubbleward end of a cross shaft 37 mounted in bearings secured to the frame in which the husking rollers are mounted and designed to transmit motion to said husking rollers.

38 represents a pinion secured to the grainward end of the shaft and meshing with a combined pinion 39 and sprocket wheel 40 journaled upon a fixed shaft 41 supported by a bracket 42 secured to the husker frame.

43 represents a bearing box secured to the bottom of the ear receiving trough 16 at its rear end, and 44 is a shaft journaled in said bearing, having sprocket wheel 21 secured to its upper end above the bottom, and a friction clutch member 45 secured thereto below the bearing box. A sprocket wheel 46 is slidably journaled on the shaft and provided with a clutch face 47 adapted to frictionally engage with the friction clutch member 45, toward which it is yieldingly pressed by means of a coil spring 48 operative between an adjustable nut 49 upon the lower end of the shaft and the hub of the said sprocket wheel.

50 represents a chain connecting sprocket wheels 46 and 40, and through which motion is transmitted to the ear conveyer chain 19.

51 represents a longitudinally arranged shaft mounted upon the rear end of the frame bars 3, having its forward end connected with the rear ends of the snapping rollers and having a balance wheel 52 secured to its rear end.

53 represents a stub shaft secured to a fixed part of the frame and having a sprocket wheel 54 and pinion 55 journaled thereon, the pinion engaging with a pinion 56 secured to shaft 51, and the sprocket wheel 54 is connected with sprocket wheel 33 by means of a chain 57, whereby motion is communicated to the snapping and stalk gathering mechanism.

What I claim as my invention, and desire to secure by Letters Patent, is:

1. A corn harvester including, in combination, carrying wheels, a wheel frame, snapping rollers mounted upon the grainward side of said wheel frame and inclined upward from front to rear, husking rollers mounted upon the stubbleward side of said wheel frame and inclined upward from front to rear, an ear conveyer trough upon the stubbleward side of said snapping rollers and parallel therewith throughout a portion of its length and then diverging laterally at the rear end of said snapping rollers, a curved chute connected with the rear ends of said husking rollers, said trough being connected with said chute, and ear conveying means, including an endless carrier mounted in said trough, the return lead of said carrier being supported in the same plane as the operative lead thereof.

2. A corn harvester including, in combination, carrying wheels, a wheel frame, snapping rollers mounted upon the grainward side of said wheel frame and inclined upward from front to rear, husking rollers mounted upon the stubbleward side of said wheel frame and inclined upward from front to rear, ear conveyer means including a trough upon the stubbleward side of said snapping rollers and adapted to receive the ears therefrom, said trough being arranged parallel with said rollers and in substantially the same plane throughout their length, then diverging rearward and stubbleward, a curved chute connected with the rear ends of said husking rollers, the delivery end of said trough being connected with said chute, ear conveying means including an endless carrier mounted in said trough, a support for the return lead of said carrier, said support being connected at its upper rear end with the curved chute and having at its lower forward end a semi-circular portion connecting with the lower end of said trough, said support being arranged substantially in the same plane as said trough.

3. A corn harvester including, in combination, carrier wheels, a frame mounted upon said wheels, snapping rollers inclined upward from front to rear of the machine and arranged outside of the grainward carrying wheel and having their axes parallel with the vertical plane containing the line of draft of the machine, husking rollers having their axes inclined upward from front to rear of the machine, an ear conveyer mechanism adapted to deliver the unhusked ears from said snapping rollers to said husking rollers, said mechanism including an endless carrier having its operative lead adjacent and parallel with said snapping rollers and outside the grainward carrying wheel, and its return lead passing upon the stubbleward side of the grainward carrying wheel.

4. A corn harvester including, in combination, carrying wheels, a frame mounted upon said wheels, snapping rollers inclined upward from front to rear of the machine and arranged outside of the grainward carrying wheel and having their axes parallel with the vertical plane containing the line of draft of the machine, husking rollers inclined upward from front to rear and having their axes parallel with the vertical plane containing the line of draft of the machine and arranged inside of the grainward carrying wheel, an ear conveyer mechanism adapted to deliver the unhusked ears from said snapping rollers to said husking rollers, said mechanism including an endless carrier having its operative lead adjacent and parallel with said snapping rollers and outside the grainward carrying wheel, and its return lead passing upon the stubbleward side of the grainward carrying wheel, the two leads being arranged in the same plane as the snapping rollers.

JOHN A. STONE.

Witnesses:
J. H. CONNER,
A. B. DACK.